Feb. 13, 1934.  R. A. WEBSTER ET AL  1,946,513
FLY-WHEEL STARTING MOTOR
Filed Dec. 16, 1931  2 Sheets-Sheet 1
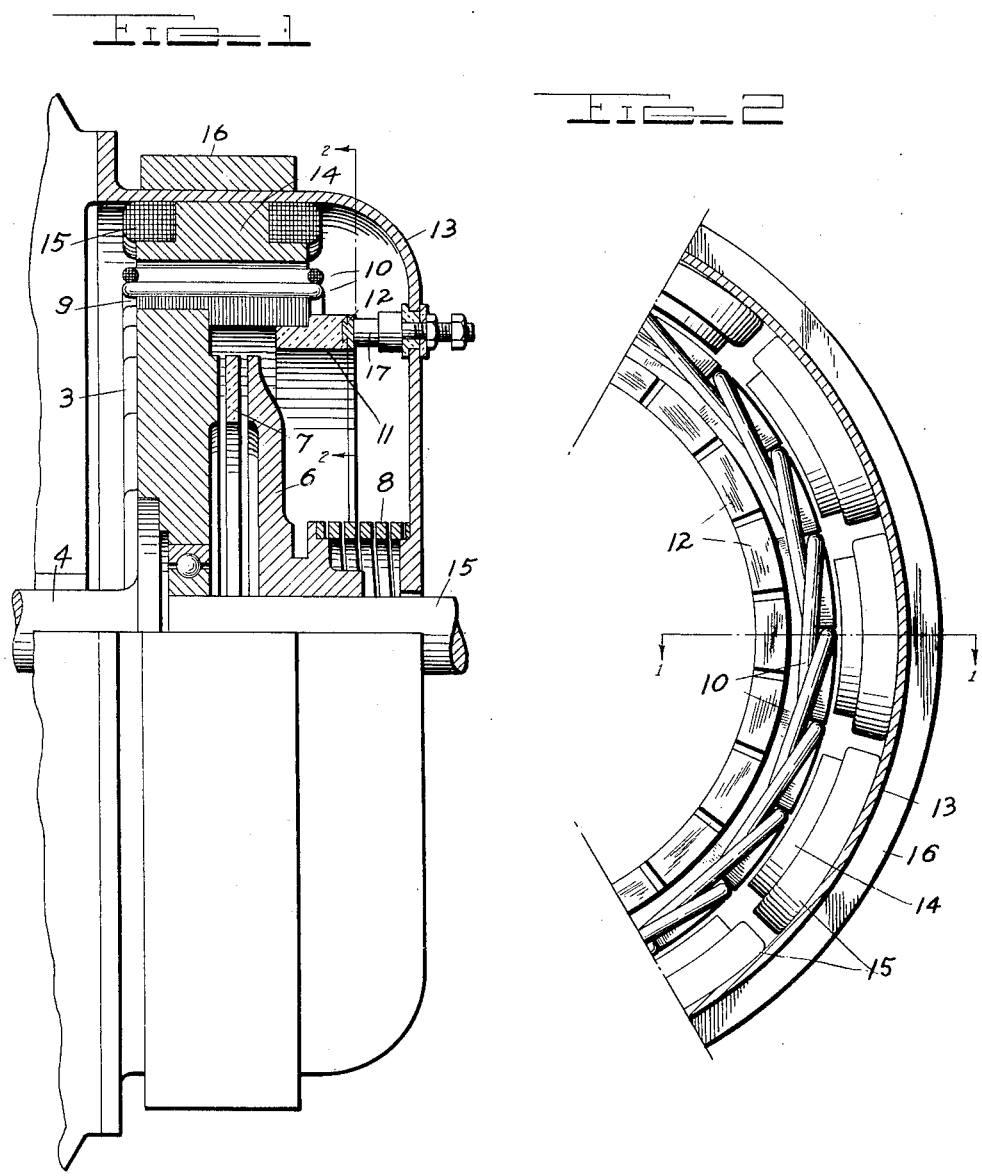
INVENTOR
Robert A Webster-Bedford K.Smith
BY
ATTORNEY Feb. 13, 1934.     R. A. WEBSTER ET AL     1,946,513
FLY-WHEEL STARTING MOTOR
Filed Dec. 16, 1931     2 Sheets-Sheet 2
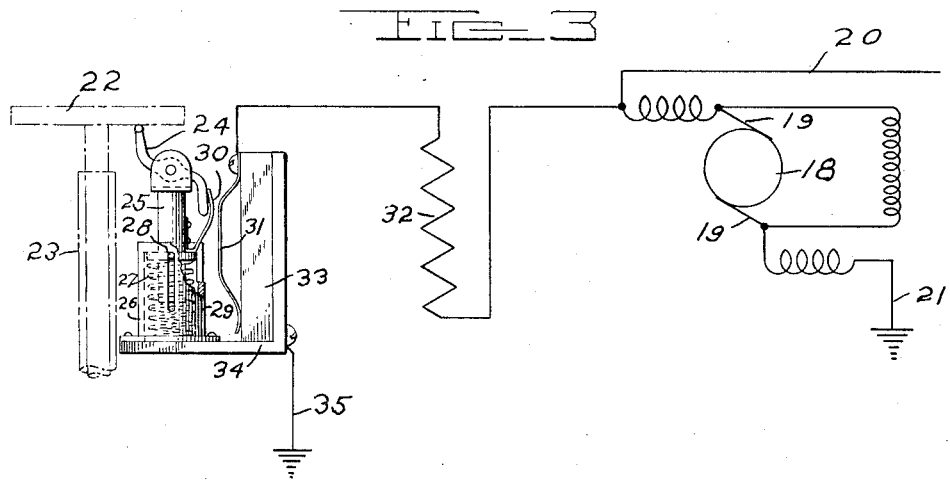
INVENTOR
R. Alden Webster
BY Bedford K. Smith
ATTORNEY Patented Feb. 13, 1934

1,946,513

UNITED STATES PATENT OFFICE 1,946,513

FLY-WHEEL STARTING MOTOR

Robert Alden Webster, Washington, D. C., and Bedford K. Smith, Alexandria, Va.

Application December 16, 1931
Serial No. 581,384

1 Claim. (Cl. 172—36)

(Granted under the act of March 3, 1883, as amended April 30, 1928; 370 O. G. 757)

This invention relates to a device to be attached to or built into a fly-wheel of an internal combustion engine to serve as a starting motor therefor, and that will act as a generator when driven by the engine.

The object of our invention is to provide a simple, effective mechanism for starting internal combustion engines which will obviate the necessity of the usual over-running clutch and other mechanical complications inherent in the mechanical cranking devices generally used, without materially altering the construction of parts that have been adopted as standard.

With the above and other objects in view, the invention consists in the construction, combination and arrangement of parts as will be described more fully hereinafter.

In the drawings:

Fig. 1 is a partial axial section of one embodiment of our invention, on line 1—1 of Fig. 2;

Fig. 2 is a fragmentary side elevation with the housing removed, on line 2—2 of Fig. 1;

Fig. 3 is a schematic diagram of the connections used to make our invention function as an electro-dynamic brake.

The fly-wheel 3 is mounted on the crankshaft 4 of the engine and is connectible with the shaft 5 that actuates the gear transmission by plate 6 slidable on the shaft 5 pressing floating friction ring 7 against the fly-wheel under the action of spring 8, the usual clutch release pedal and linkage connected to the plate 6 being used.

Soft magnet steel laminations 9 are secured to the fly-wheel to form the rim thereof and armature coils 10 are set in slots in these laminations as is usual in dynamo-electric machines. Insulating ring 11 bears against one lateral face and the adjacent portion of the radially inner face of the laminations. Commutator segments 12 are set in ring 11 to contact with brushes 17 (one brush only being shown) mounted in the housing 13, the segments 12 being suitably connected to the coils 10 to constitute a direct current multipolar motor-generator.

Field poles 14 are secured to the housing 13 and carry field coils 15 in operative relation to the armature coils 10. A band 16 of soft iron is seated on housing 13 around field poles 14 to decrease the magnetic reluctance of that part of the mechanism.

It is apparent that when electric current is sent through the armature coils 10, a torque will be applied to crankshaft 4 to start the engine, but as soon as the back electromotive force set up in those coils by rotation of the fly-wheel becomes sufficiently great to overcome the applied voltage, the device will operate as a generator.

If desired, for the purpose of cheapening the construction, slots for coils 10 may be formed in the fly-wheel, and the housing 13 may be thickened instead of placing thereon the band 16, though the efficiency of the device will be lessened thereby.

Our invention may be used as an electro-dynamic brake when connected as shown in Fig. 3. Ordinarily, the current taken from generator 18 by brushes 19 is conducted to a battery (not shown) by wire 20, the circuit being completed through ground 21 according to usual practice. Brake pedal 22 is slidable for a limited distance in a sleeve 23 that is connected to actuate the service brake of the vehicle after pedal 22 has been sufficiently depressed to move the sleeve. Bell crank lever 24 is pivotally mounted in a shank 25 that is slidable in a housing 26, there being a spring 27 to hold the shank normally at its highest position and a pin 28 in slot 29 to prevent rotation of the shank. One end of lever 24 is disposed to contact pedal 22 and the other moves spring contact 30 into contact with spring 31 that is connected to the positive brush through a resistance 32 having high current carrying capacity. Spring 31 is mounted on insulating block 33 carried by support 34 to which housing 26 is secured, the support being grounded to the frame of the vehicle at 35.

When pedal 22 is depressed, lever 24 moves spring 30 against spring 31 and closes the circuit through generator 18, resistance 32, housing 26, and the frame ground, which permits a heavy current to flow and causes a considerable braking torque to be exerted on the drive shaft of the vehicle. If the braking effort is insufficient, continued movement of pedal 22 actuates the usual service brake, the spring 27 permitting sufficient movement of the shank 25 to allow depression of pedal 22 to the extent necessary to set the service brake.

It will be understood that the above description and accompanying drawings comprehend only the general and preferred embodiment of our invention and that various changes in construction, proportion and arrangement of parts may be made within the scope of the appended claim without sacrificing any of its advantages.

The invention described herein may be manufactured and used by or for the Government of the United States for governmental purposes without the payment of any royalties thereon or therefor.

We claim:

The combination with a driven shaft, of a wheel member rotatably mounted thereon, said member having a laterally outstanding radially extending annular face to cooperate with a clutch element, a laminated body having transverse slots in the periphery thereof disposed around said wheel and extending laterally beyond the face thereof, an annulus of insulating material disposed against the inner periphery and the adjacent lateral face of the projecting portion of said body, commutator segments mounted in said annulus, armature coils in the slots in said body connected to said commutator segments, a housing inclosing the aforesaid parts, field poles mounted in said housing to coact with said armature coils, a band of material having low magnetic reluctance disposed around said housing over the zone of said poles, and brushes carried by said housing to contact said commutator segments.

ROBERT ALDEN WEBSTER.
BEDFORD K. SMITH.